United States Patent
Nagashima

(10) Patent No.: US 9,182,995 B2
(45) Date of Patent: Nov. 10, 2015

(54) MANAGEMENT DEVICE, MANAGEMENT DEVICE CONTROL METHOD, AND STORAGE MEDIUM

(71) Applicant: CANON KABUSHIKI KAISHA, Tokyo (JP)

(72) Inventor: Takeyuki Nagashima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/953,000

(22) Filed: Jul. 29, 2013

(65) Prior Publication Data
US 2014/0047460 A1 Feb. 13, 2014

(30) Foreign Application Priority Data
Aug. 10, 2012 (JP) ................................. 2012-178776

(51) Int. Cl.
*G06F 9/44* (2006.01)
(52) U.S. Cl.
CPC .................................... *G06F 9/4411* (2013.01)
(58) Field of Classification Search
CPC ... G06F 3/1285; G06F 3/1226; G06F 3/1247; G06F 9/4411; G06F 3/1284; G06F 3/1288; G06F 3/1289; G06F 8/60; G06F 3/1203; G06F 3/1228; G06F 3/1254; A63F 2300/552
See application file for complete search history.

(56) References Cited

U.S. PATENT DOCUMENTS

| | | | |
|---|---|---|---|
| 7,349,960 B1 * | 3/2008 | Pothier et al. | 709/224 |
| 7,620,960 B2 | 11/2009 | Nagashima | |
| 2006/0230261 A1 * | 10/2006 | Yoshimura et al. | 713/1 |
| 2008/0201714 A1 | 8/2008 | Nagashima | |
| 2011/0075207 A1 * | 3/2011 | Nakata | 358/1.15 |
| 2011/0238784 A1 * | 9/2011 | Takazawa | 709/217 |
| 2011/0276724 A1 * | 11/2011 | Mullis et al. | 710/8 |

FOREIGN PATENT DOCUMENTS

| | | |
|---|---|---|
| JP | 2003-196101 A | 7/2003 |
| JP | 2010-97302 A | 4/2010 |
| KR | 2012-0074321 A | 7/2012 |

OTHER PUBLICATIONS

Korean Office Action dated Aug. 27, 2015 in corresponding Korean Patent Application No. 10-2013-0092951.

* cited by examiner

*Primary Examiner* — Tuan Dao
(74) *Attorney, Agent, or Firm* — Fitzpatrick, Cella, Harper & Scinto

(57) ABSTRACT

A management device manages management information including a type and a version of a driver installed on each client device and an output destination, specifies client devices on which a driver corresponding in type to the peripheral device has been installed with reference to the management information when the driver to be utilized in the client devices is changed in accordance with the change in information of the peripheral device, extracts a client device in which the peripheral device is set as the output destination from among the specified client devices with reference to the management information, and transmits an instruction for installing a driver to be changed to the extracted client device.

7 Claims, 16 Drawing Sheets

FIG. 5A

| Device list | | | | |
|---|---|---|---|---|
| Device name | Product name | PDL | Firmware | Address |
| DevA-1 | DevA | PCL | Firm1 | Addr1 |
| DevA-2 | DevA | PCL | Firm1 | Addr2 |
| : | : | : | : | : |
| DevA-x | DevA | PCL | Firm1 | AddrX |

FIG. 5B

| Device list | | | | |
|---|---|---|---|---|
| Device name | Product name | PDL | Firmware | Address |
| DevA-1 | DevA | PCL | Firm2 | Addr1 |
| DevA-2 | DevA | PCL | Firm1 | Addr2 |
| : | : | : | : | : |
| DevA-x | DevA | PCL | Firm1 | AddrX |

FIG. 5C

| Device list | | | | |
|---|---|---|---|---|
| Device name | Product name | PDL | Firmware | Address |
| DevA-1 | DevA | PCL | Firm2 | Addr1 |
| : | : | : | : | : |
| DevA-x | DevA | PCL | Firm1 | AddrX |
| DevB-1 | DevB | PS/PCL | Firm1 | Addr2 |

FIG. 6

| Device list | | | | |
| --- | --- | --- | --- | --- |
| Driver name | Version | PDL | Corresponding product name | Corresponding firmware |
| DrvA | | PCL | DevA | Firm1 |
| DrvA | v2.0 | PCL | DevA | Firm2 |
| DrvB-1 | v1.0 | PCL | DevB | Firm1 |
| DrvB-2 | v1.0 | PS | DevB | Firm1 |

FIG. 7

| Client list | | | | | |
| --- | --- | --- | --- | --- | --- |
| Client name | Driver information | | | | Port information |
| | Driver name | version | PDL | Printer name | |
| PCA-1 | DrvA | v1.0 | PCL | PrnA-1 | IP_Addr1 |
| PCA-2 | DrvA | v1.0 | PCL | PrnA-1 | IP_Addr1 |
| : | : | : | : | : | : |
| PCA-x | DrvA | v1.0 | PCL | PrnA-1 | IP_Addr1 |
| PCB-1 | DrvA | v1.0 | PCL | PrnA-2 | IP_Addr2 |
| PCB-2 | DrvA | v1.0 | PCL | PrnA-2 | IP_Addr2 |
| : | : | : | : | : | : |
| PCB-x | DrvA | v1.0 | PCL | PrnA-2 | IP_Addr2 |
| PCC-1 | DrvA | v1.0 | PCL | PrnA-1 | IP_Addr1 |
| | DrvA | v1.0 | PCL | PrnA-2 | IP_Addr2 |
| PCC-2 | DrvA | v1.0 | PCL | PrnA-1 | IP_Addr1 |
| | DrvA | v1.0 | PCL | PrnA-2 | IP_Addr2 |
| : | : | : | : | : | : |
| PCC-x | DrvA | v1.0 | PCL | PrnA-1 | IP_Addr1 |
| | DrvA | v1.0 | PCL | PrnA-2 | IP_Addr2 |

FIG. 12

```
Driver update task creation
STEP1: Driver update mode selection
                        [ Next ]  [ Cancel ]
  ○ | Normal update mode
  ◉ | Simple update mode
```

FIG. 13A

| | Driver name | Version | PDL | Corresponding product name | Corresponding firmware |
|---|---|---|---|---|---|
| ☐ | DrvA | v1.0 | PCL | DevA | Firm1 |
| ☑ | DrvA | v2.0 | PCL | DevA | Firm2 |
| ☐ | DrvB-1 | v1.0 | PCL | DevB | Firm1 |
| ☐ | DrvB-2 | v1.0 | PS | DevB | Firm1 |

Driver update task creation
STEP2: Driver selection
[ Next ]  [ Cancel ]

FIG. 13B

Driver update task creation
STEP2: Device selection
[ Next ]  [ Cancel ]

Device selection

| | Device name | Product name | PDL | Firmware | Address |
|---|---|---|---|---|---|
| ☐ | DevA-1 | DevA | PCL | Firm2 | Addr1 |
| | ⋮ | ⋮ | ⋮ | ⋮ | ⋮ |
| ☐ | DevA-x | DevA | PCL | Firm1 | Addrx |
| ☑ | DevB-1 | DevB | PS/PCL | Firm1 | Addr2 |

Manual settings

| | Device name | Product name | PDL | Firmware | Address |
|---|---|---|---|---|---|
| ☐ | | | | | |
| ☐ | | | | | |
| ☐ | | | | | |

FIG. 14A

```
Driver update task creation
  STEP3: Task registration
                                          [Register]  [Cancel]
  Task type
    Driver update task
  Selected driver
    | Driver name | Version | PDL | Corresponding product name | Corresponding firmware |
    | DrvA | v2.0 | PCL | DevA | Firm2 |
  Driver update property settings
    ☑ Forcibly update driver
  Task schedule settings
    yyyy/mm/dd-hh:mm
```

FIG. 14B

```
Driver update task creation
  STEP3: Task registration
                                          [Register]  [Cancel]
  Task type
    Driver update task
  Selected driver
    | Device name | Product name | PDL | Firmware | Address |
    | DevB-1 | DevB | PCL/PS | Firm1 | Addr2 |
  Update driver settings
    |   | Driver name | Version | PDL | Corresponding product name | Corresponding firmware |
    | ☑ | DrvB-1 | v1.0 | PCL | DevB | Firm1 |
    | ☑ | DrvB-2 | v1.0 | PS  | DevB | Firm1 |
  Task schedule settings
    yyyy/mm/dd-hh:mm
```

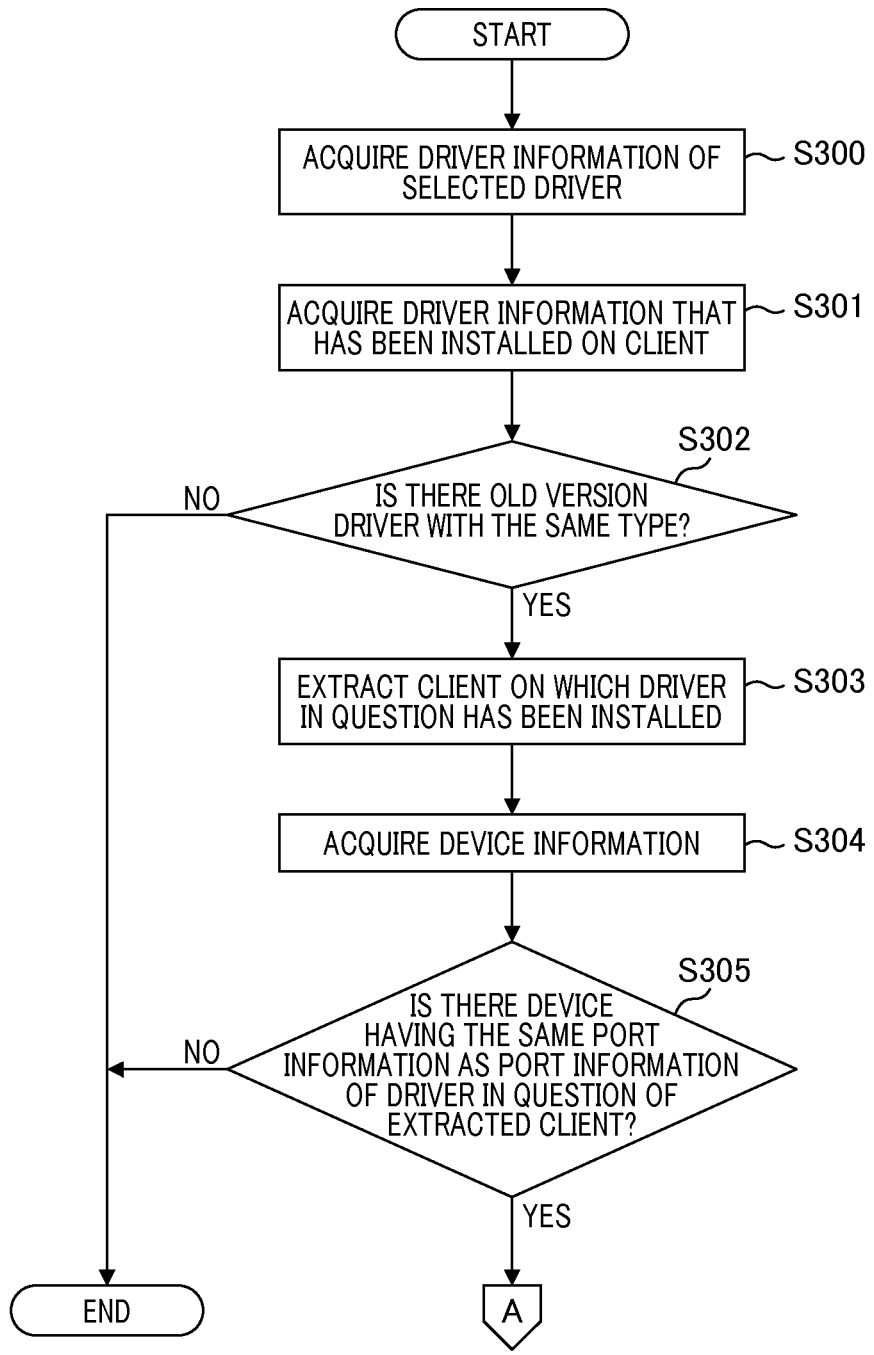

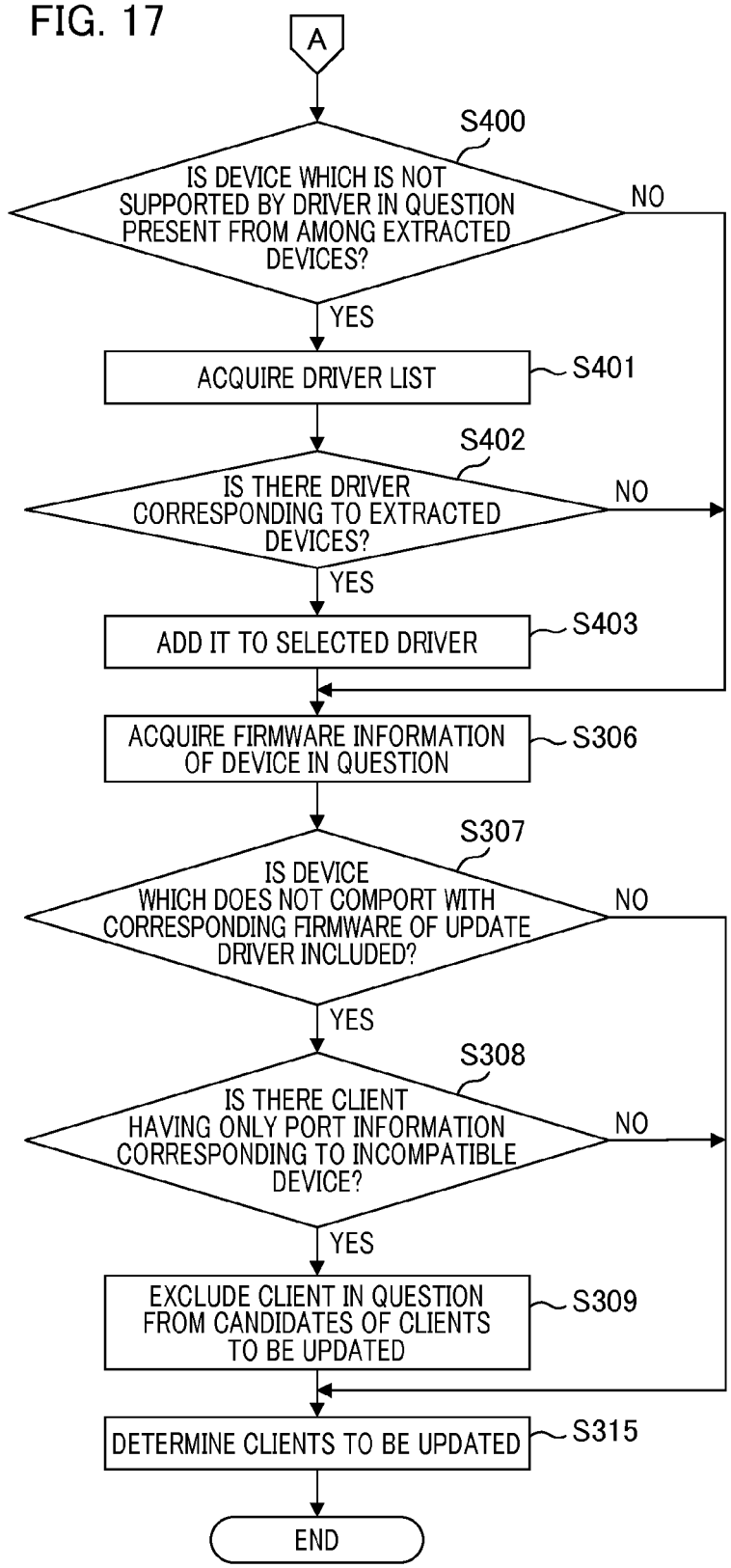

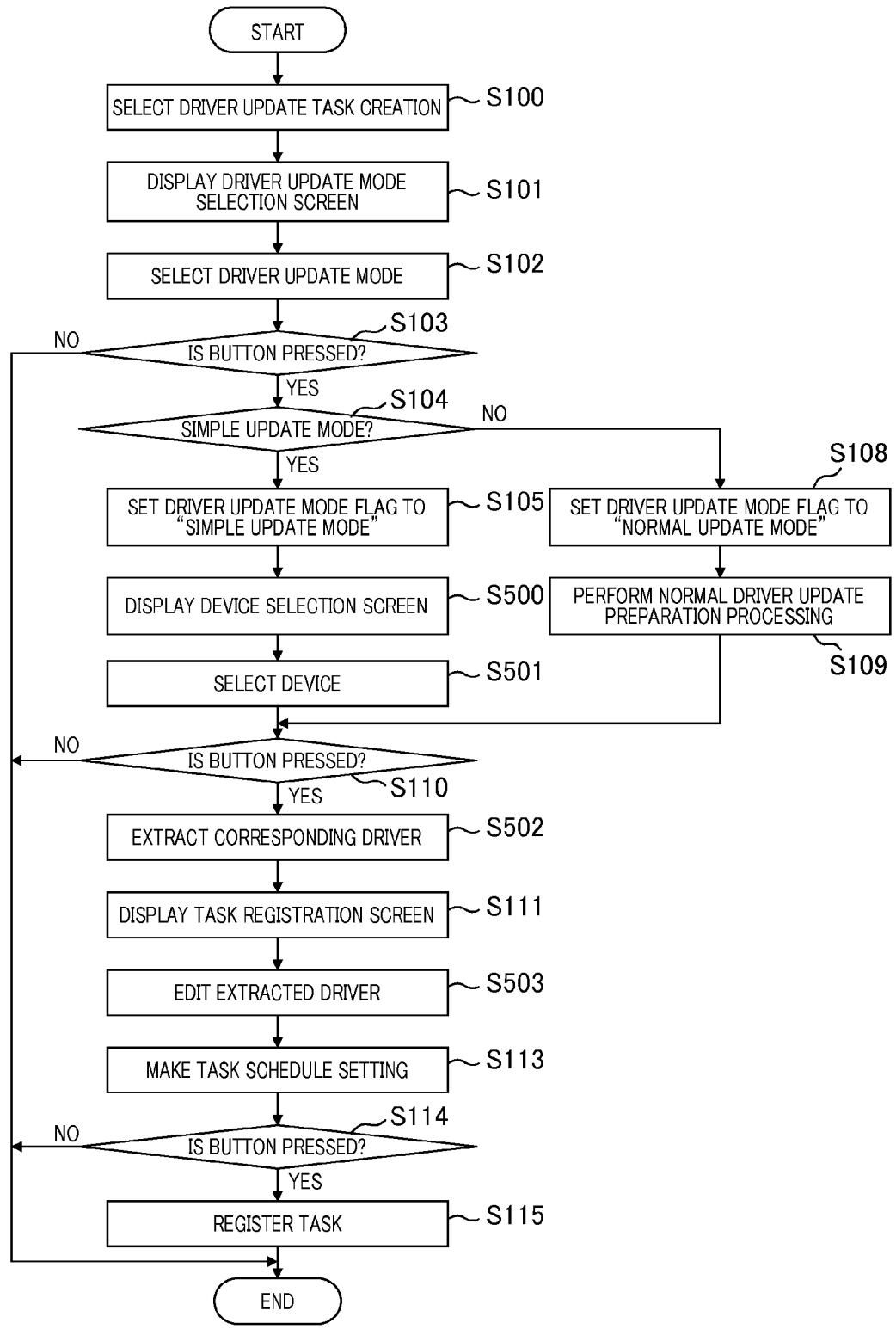

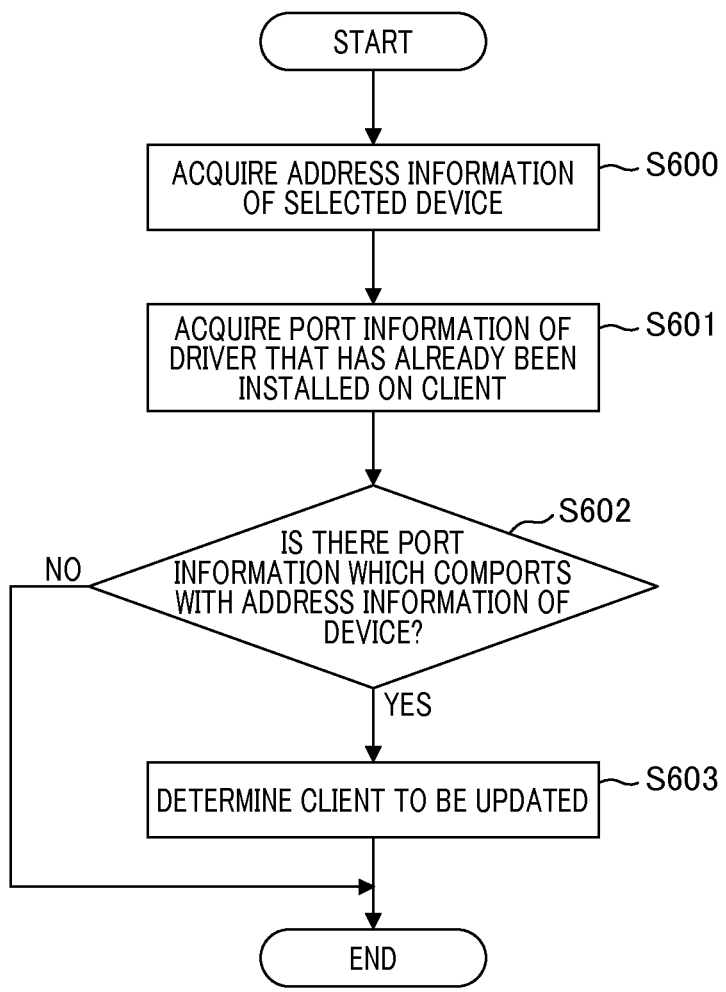

MANAGEMENT DEVICE, MANAGEMENT DEVICE CONTROL METHOD, AND STORAGE MEDIUM

BACKGROUND OF THE INVENTION

1. Field of the Invention

The present invention relates to a technique that transmits a driver installation instruction to a client device.

2. Description of the Related Art

There has been proposed a management server that manages a driver update to a client device having a driver corresponding to its device via a network. The management server displays a client list and updates a driver when an administrator who uses the management server manually selects a client to be updated from drivers installed on clients and print port information.

Japanese Patent Laid-Open No. 2010-97302 discloses a management device that manages printer drivers and firmware by registering device information, client information, and driver information. More specifically, the management device disclosed in Japanese Patent Laid-Open No. 2010-97302 registers device information, client information, driver information including version information of a driver to be installed on a client. Then, the management device acquires driver information including the version of a driver actually installed on a client at regular intervals to thereby determine whether or not a proper driver has been installed on the client. When the management server determines that a proper version driver has not been installed on the client, the management server updates the driver installed on the client to a proper version driver.

However, when a management device that manually selects a client device for which the driver is to be updated is used, considerable time and labor are required for the administrator if the number of clients for which the driver is to be updated is thousands. Also, when the driver installed on the client device that has been registered in the management server in advance is updated, the following cases may occur because port information associated with a driver installed on the client is not taken into consideration.

Firstly, when a plurality of printer objects each having a different output destination device has been installed on a client device from the identical driver, all the printer objects are updated upon update of the driver. Thus, when there are combinations of firmware mounted on devices and corresponding drivers and firmware mounted on output destination devices is different from one another, combinations of devices and drivers, which are not intended by the administrator, may be made. Secondary, due to device replacement, when the addresses of the output destination devices are identical but corresponding drivers are drivers for devices prior to replacement, unauthorized combinations may be made between devices and drivers. Thus, the conventional management device does not take a combination of firmware mounted on each output destination device and its corresponding driver into consideration.

SUMMARY OF THE INVENTION

The present invention provides a mechanism that manages device information and driver information installed on client devices so as to be able to appropriately select a client device for which the driver is to be updated from the plurality of client devices.

According to an aspect of the present invention, a management device that provides an instruction for installing a driver for use in a peripheral device to a plurality of client devices via a network is provided that includes a management unit configured to manage management information including a type and a version of a driver installed on each client device and an output destination; a specification unit configured to specify client devices on which a driver corresponding in type to the peripheral device has been installed with reference to the management information when the driver to be utilized in the client devices is changed in accordance with the change in information of the peripheral device; an extraction unit configured to extract a client device in which the peripheral device is set as the output destination from among the specified client devices with reference to the management information; and a transmission unit configured to transmit an instruction for installing a driver to be changed to the extracted client device.

Further features of the present invention will become apparent from the following description of exemplary embodiments with reference to the attached drawings.

BRIEF DESCRIPTION OF THE DRAWINGS

FIGS. 5A to 5C illustrate an exemplary device list.

FIG. 6 illustrates an exemplary driver list.

FIG. 7 illustrates an exemplary client list.

FIG. 12 is a diagram illustrating an example of driver update mode selection.

FIGS. 13A and 13B are diagrams illustrating an exemplary driver update task creation screen.

FIGS. 14A and 14B are diagrams illustrating an exemplary driver update task registration screen.

FIG. 16 is a flowchart for determining a client to be updated.

FIG. 17 is a flowchart for determining a client to be updated.

FIG. 18 is a flowchart for creating a remote driver update task.

FIG. 19 is a flowchart for determining a client to be updated.

DESCRIPTION OF THE EMBODIMENTS

First Embodiment

Figure 1:
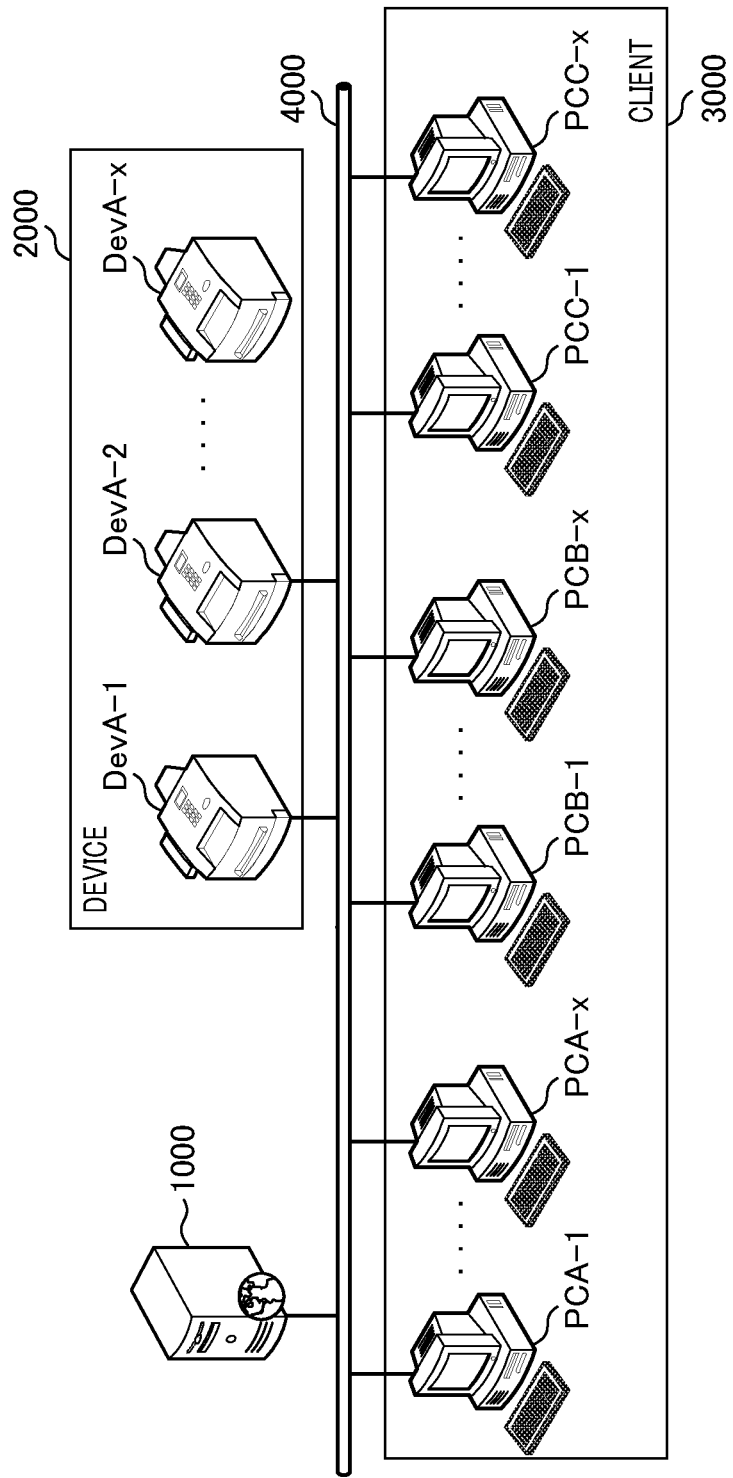
FIG. 1 illustrates an example of a configuration of the management system of the present embodiment.

FIG. 1 is a diagram illustrating an example of a network configuration of a management system according to a first embodiment. The management system includes a management server 1000 that functions as a management device, devices 2000 (DevA-1 to DevA-x) that are peripheral devices, and clients 3000 (PCA-1 to PCA-x, PCB-1 to PCB-x, and PCC-1 to PCC-x). The management server 1000, the devices 2000, and the clients 3000 are connected to each other via a communication line 4000. The communication line 4000 is wired or wireless.

Figure 2:
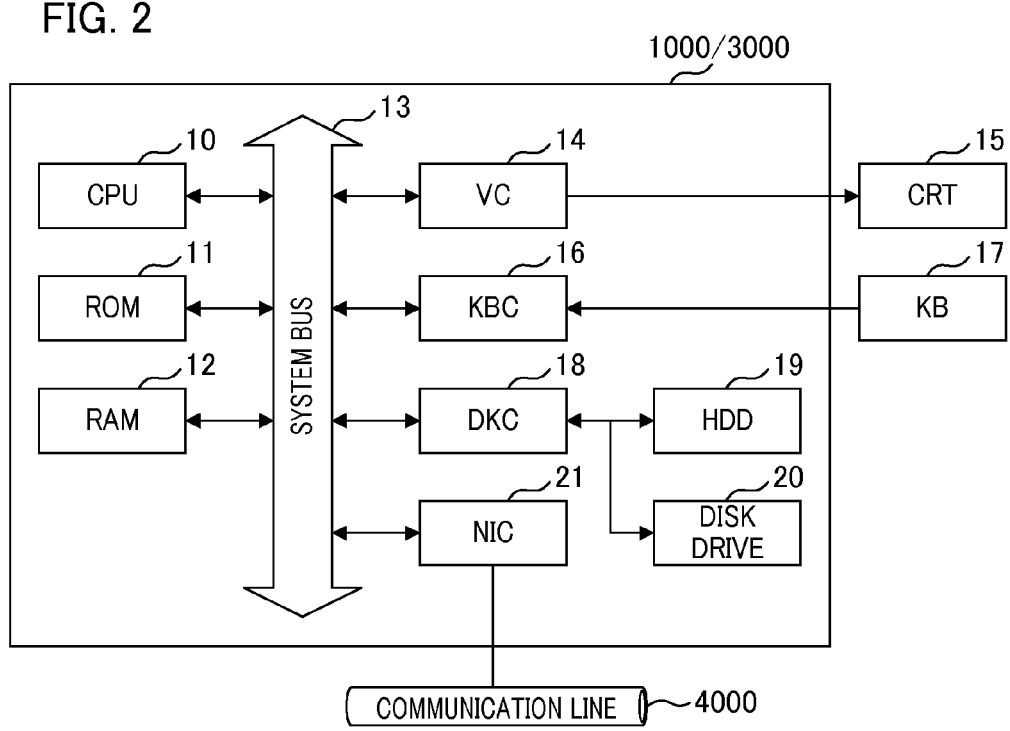
FIG. 2 illustrates a hardware configuration of the devices and the print server constituting the management system.

FIG. 2 is a diagram illustrating a hardware configuration of the management server 1000 and the client 3000. Hereinafter, a description will be given of a hardware configuration by taking the management server 1000 as an example. A RAM 12 is used as the work area of a CPU 10, and the CPU 10 executes programs stored in a ROM 11 and an HDD 19 and executes the functions of the present embodiment such as the function of a device management unit 30 to be described below with reference to FIG. 3 via a system bus 13. The CPU 10 is an abbreviation for Central Processing Unit, and the RAM 12 and the ROM 11 are abbreviation for Random Access Memory and Read Only Memory, respectively.

The device management unit 30 of the management server 1000 is supplied by a storage medium such as an FD, a CD-ROM, a DVD, a magnetic tape, an IC memory card, or the like which is mountable on a Disk Drive 20. The CPU 10 performs user interface display on a display device (CRT) 15 via a video card (VC) 14. Furthermore, the CPU 10 performs control in accordance with an input instruction to a user interface from a keyboard (KB) 17 or a pointing device such as a mouse via a keyboard controller (KBC) 16. Also, the CPU 10 performs data communication between the device 2000 and the client 3000 on the communication line 4000 via a network interface board (NIC) 21. A driver control unit 40 of the client 3000 also has the same configuration as that of the device management unit 30 of the management server 1000.

Figure 3:
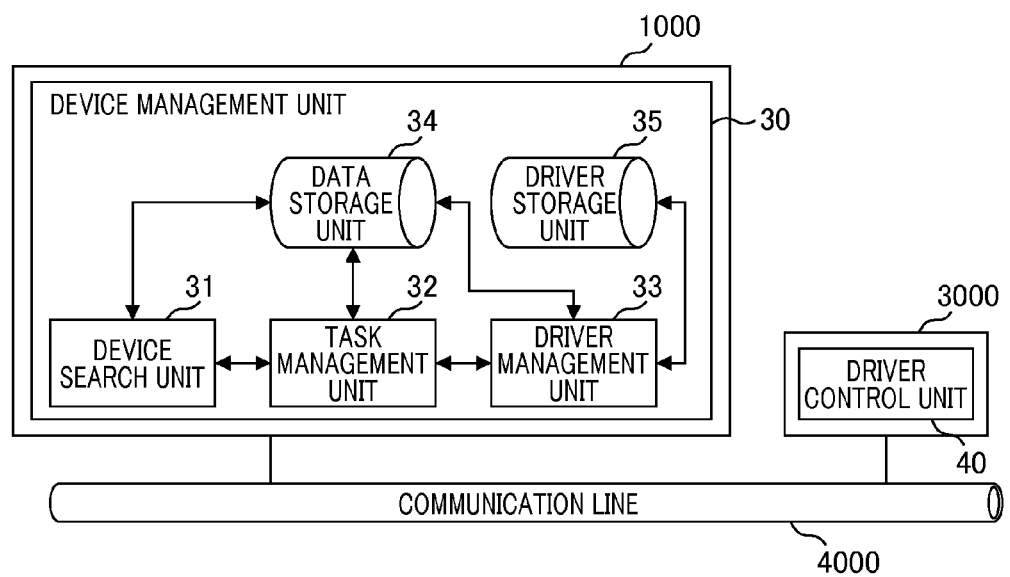
FIG. 3 illustrates a software configuration of the information processing apparatus of the present invention.

FIG. 3 is a diagram illustrating an example of a software configuration of the device management unit 30 running on the management server 1000 and the driver control unit 40 running on the client 3000. The device management unit 30 includes a device search unit 31, a task management unit 32, a driver management unit 33, a data storage unit 34, and a driver storage unit 35. The device management unit 30 can be implemented as a Web-based application. In this case, the client 3000 can also utilize the management server via the Web browser.

The task management unit 32 has a function that manages the schedule of a task which is generated by the device search unit 31 or the driver management unit 33 and is stored in the data storage unit 34. The task management unit 32 instructs the device search unit 31 storing the task or the driver management unit 33 to execute the task in accordance with the schedule set in the task. The device search unit 31 has a function that searches the device 2000 via an SNMP, an IP Broadcast, an SLP/Multicast, or the like which is known in peer groups. Upon searching the device 2000, the device search unit 31 can acquire device information such as a MIB (Management Information Base) via the communication line 4000 such as a LAN and set the device information to the device 2000. In the present embodiment, the device search unit 31 acquires device information such as device name, product name, PDL, firmware, address, and the like as a result of device search and stores the device information in the data storage unit 34. Of course, device information acquired by the device search unit 31 is not limited thereto but any device information required for managing the device 2000 may be acquired. Also, when the device search unit 31 performs device search at regular intervals and finds that firmware has been updated, the device search unit 31 acquires information of the updated firmware to thereby update a device list.

An exemplary device search result is shown in FIG. 5A. The device list shown in FIG. 5A includes device information including device name, product name, PDL, firmware, and address. For example, the device list indicates that the device DevA-1 is a device with a product name of DevA, PDL of PCL, firmware of Firm1, and an address of Addr1. The same also applies to the devices DevA-2 to DevA-x. Device information may also be acquired by importing a file such as a CSV file other than by performing device search by the device search unit 31.

The driver management unit 33 has a driver management function, a driver distribution function, and a client management function. The driver management function of the driver management unit 33 stores the entity of a driver in the driver storage unit 35 and driver information of the driver in the data storage unit 34 for management.

An example of driver information managed by the driver management unit 33 is shown in FIG. 6. The driver list shown in FIG. 6 includes information such as driver name, version, PDL, corresponding product name, and corresponding firmware. For example, the driver list indicates that a driver with a driver name of DrvA, a version of v1.0, and PDL of PCL corresponds to the device 3000 with firmware of Firm1 and a product name of DevA.

Next, the driver distribution function of the driver management unit 33 is a function that realizes installation/uninstallation of a driver or port to the client 3000 via a remote task. The client 3000 is specified in the remote task and the address included in device information of the device 3000 and information such as driver information, port information, or the like are set to the remote task. In this case, the driver control unit 40 which is a service program having a driver installation function and a port creation function shown in FIG. 3 resides in the client 3000 on which the remote task is to be executed. Communication between the driver control unit 40 and the driver management unit 33 is realized by a Web service using a protocol such as SOAP (Simple Object Access Protocol) or the like.

Here, the driver control unit 40 has a function that updates an installed driver and performs driver replacement in accordance with driver and port information instructed from the driver management unit 33. Here, an update of an installed driver means to update an installed driver to the same type of the driver with a different version. Driver replacement means to uninstall an installed driver and to install a new driver instructed from the driver management unit 33. Furthermore, in the case of driver replacement, the driver control unit 40 also has a function that associates port information associated with an uninstalled driver with a newly installed driver.

Also, the client management function of the driver management unit 33 is a function that acquires information relating to a driver or port installed on the client 3000 from the driver control unit 40 of the client 3000 and manages the information.

FIG. 7 is a diagram illustrating an example of client information (management information) managed by the driver management unit 33. Client information shown in FIG. 7 that is managed by the management unit 33 as management information includes client name, driver name, version information, PDL type, printer name, port information, and the like. Here, driver name, version information, PDL type, and printer name are also collectively referred to as "driver information".

For example, the client PCA-1 indicates that a driver with a driver name of DrvA, a version of v1.0, and PDL of PCL has been installed as a printer name of PrnA-1. Furthermore, it can be seen that the driver has port information IP_Addr1 formed from Addr1 which is the address of the device DevA-1 and the driver output destination is the device DevA-1. The clients PCA-2 to PCA-x indicate that the same driver as that installed on the client PCA-1 has been installed. The clients PCB-1 to PCB-x indicate that the same driver as that installed on the client PCA-1 has been installed but port information is IP_Addr2 and the output destination is the device DevA-2.

Here, notification of client information from the driver control unit 40 to the driver management unit 33 may be performed upon occurrence of an event such as addition, update, deletion, or the like of a driver or port information, upon activation of the client 3000, upon request of any information from the driver management unit 33, or upon the combination thereof.

The data storage unit 34 is a data storage medium for database or the like running on the HDD 19 and stores device information or driver information as described above. Also, the driver storage unit 35 is a storage area for storing the entity of a driver, such as an FTP server, an HTTP server, or a file server running on the HDD 19 as described above. Note that the data storage unit 34 and the driver storage unit 35 may be provided in the same server as the management server 1000 as in the present embodiment or may also be provided in another server from the management server 1000.

Figure 4:
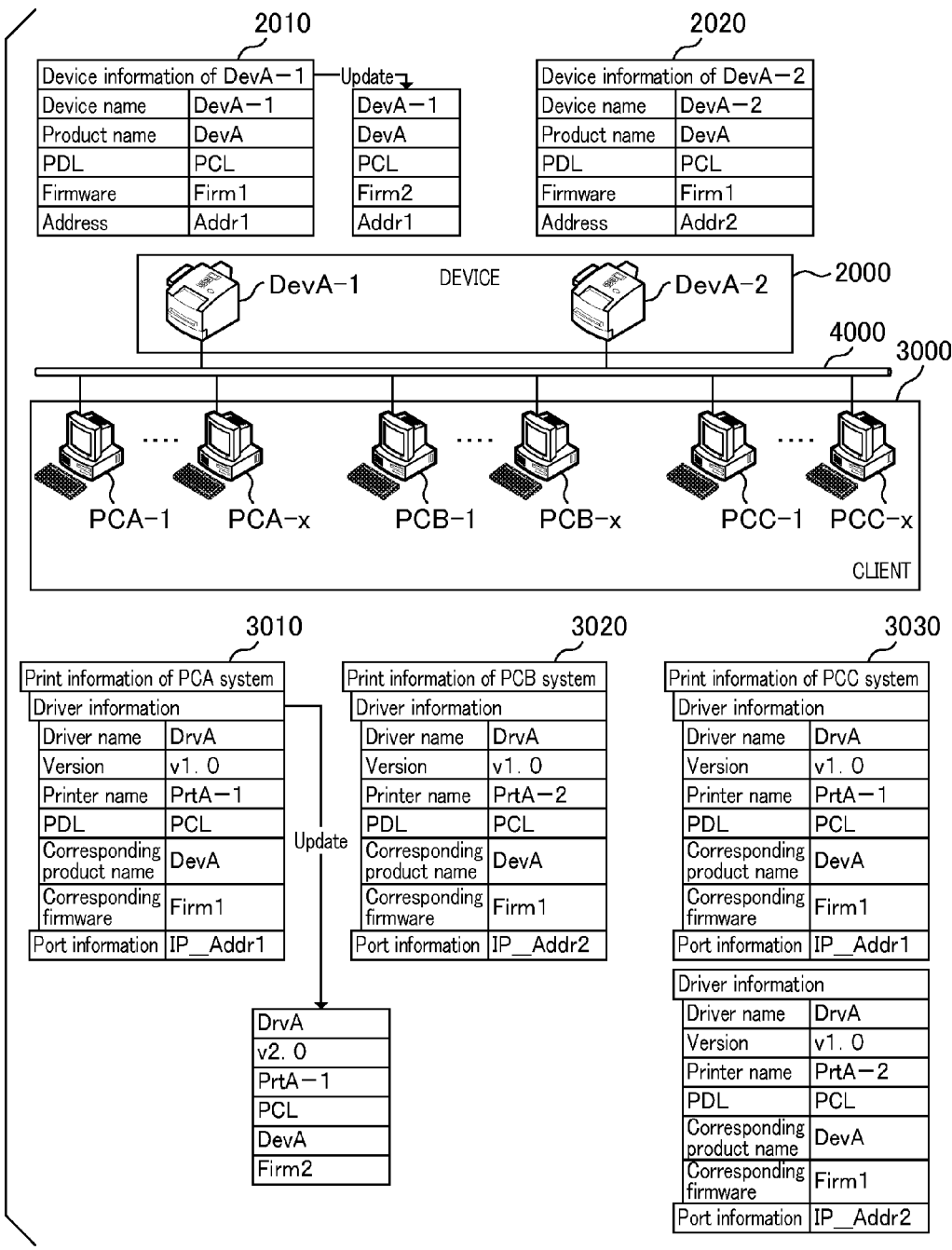
FIG. 4 illustrates an example of information provided in the devices of the management system.

FIG. 4 is a diagram illustrating an example of a network configuration of the device 2000 and the client device 3000 of the management system of the present embodiment and an example of information provided in the devices. The device 2000 includes devices with device names of DevA-1 and DevA-2. The client 3000 includes PCA-1 to PCA-x, PCB-1 to PCB-x, and PCC-1 to PCC-x. The device 2000 and the client device 3000 are connected to each other via the communication line 4000.

Here, an example of the device 2000 serving as a peripheral device includes an image forming device in the present invention. The image forming device may be an SFP only having a print function and a fax function or may also be an MFP having a print function, a scanner function, a copy function, a fax function, and the like.

The client device 3000 can perform printout from a local printer or a network-connected printer via a driver from application. Hereinafter, the device 2000 with a device name of DevA-1 is referred to as a "device Dev-1" and the client device 3000 (PCA-1) is referred to as a "client PCA-1".

Here, the term "driver" refers to a printer driver, a FAX driver, or a scan driver. The printer driver is software that forms print data corresponding to the device 3000 for output in accordance with a print instruction from a client. Also, print data formed by the driver is sent to the device 2000 via port. Printout from a local printer means a print system in which print data is directly sent from the client 3000 to the device 2000. On the other hand, printout from a network-connected printer means a print system in which print data is sent from the client 3000 via a sharing printer on a print server corresponding to a network-connected printer.

Also, the devices DevA-1 and DevA-2 have device information 2010 and 2020, respectively. The devices DevA-1 and DevA-2 are devices with the same product name, the same PDL, and the same firmware but are devices with a different device name and a different address. Specifically, it can be seen from the device information 2010 and 2020 that the identical driver can be used for printout from the devices DevA-1 and DevA-2.

Here, the term "PDL" is a page description language for forming data generated by a driver. Examples of PDL include PCL (Printer Control Language), PS (Post Script), and the like. The term "firmware" means firmware installed on the device 2000. The term "address" is an address through which the device 2000 can receive print data from the client 3000 and a port corresponding to the address is formed on the client 3000.

On the other hand, the clients PCA-1 to PCA-x, PCB-1 to PCB-x, and PCC-1 to PCC-x have print information 3010, 3020, and 3030, respectively, composed of driver information and port information. Here, the term "printer name" is the name of a printer object to be generated upon installation of a driver. The term "corresponding firmware" indicates which firmware of the device 3000 corresponds to a driver. Also, the term "port" is a print port corresponding to the address of each of the device information 2010 and 2020. The output destination device of print data is specified by the port.

As shown in FIG. 4, for example, the clients PCA-1 to PCA-x have driver information of the driver DrvA (version v1.0) corresponding to the device DevA (firmware Firm1). Also, the clients PCA-1 to PCA-x have port information in which the port IP_Addr1 to be output to the device DevA-1 is formed. The clients PCB-1 to PCB-x have driver information of the driver DrvA (version v1.0) corresponding to the device DevA (firmware Firm1). Also, the clients PCB-1 to PCB-x have port information in which the port IP_Addr2 to be output to the device DevA-2 is formed. In the clients PCC-1 to PCC-x, two printer objects with a different output destination are formed from the driver DrvA (version v1.0) corresponding to the device DevA (firmware Firm1).

Thus, print data from the clients PCA-1 to PCA-x is output to the device DevA-1, and print data from the clients PCB-1 to PCB-x is sent to the device DevA-2. Also, print data from the clients PCC-1 to PCC-x is sent to the device DevA-1 or DevA-2 by switching a printer object.

Here, as shown in FIG. 4, assume that firmware in the device information 2010 of the device DevA-1 is updated from Firm1 to Firm2. On the other hand, no change is made to the device information 2020 of the device DevA-2. Also, assume that a driver corresponding to the device DevA-1 of which firmware has been updated to the firmware Firm 2 has a version v2.0 of the driver DrvA. At this time, the client 3000 to be updated upon driver update is as follows.

It is preferable that the clients PCA-1 to PCA-x in which only the device DevA-1 is set as the output destination are clients to be updated. Also, it is preferable that the clients PCB-1 to PCB-x in which only the device DevA-2 is set as the output destination are not clients to be updated. On the other hand, it is preferable not to automatically determine that the clients PCC-1 to PCC-x in which the devices DevA-1 and DevA-2 are set as the output destinations are not the clients to be updated by using two printer objects formed from the identical driver. This is because, if a driver for one printer object is updated, a driver for the other printer object using the identical driver is also automatically updated.

Figure 8:
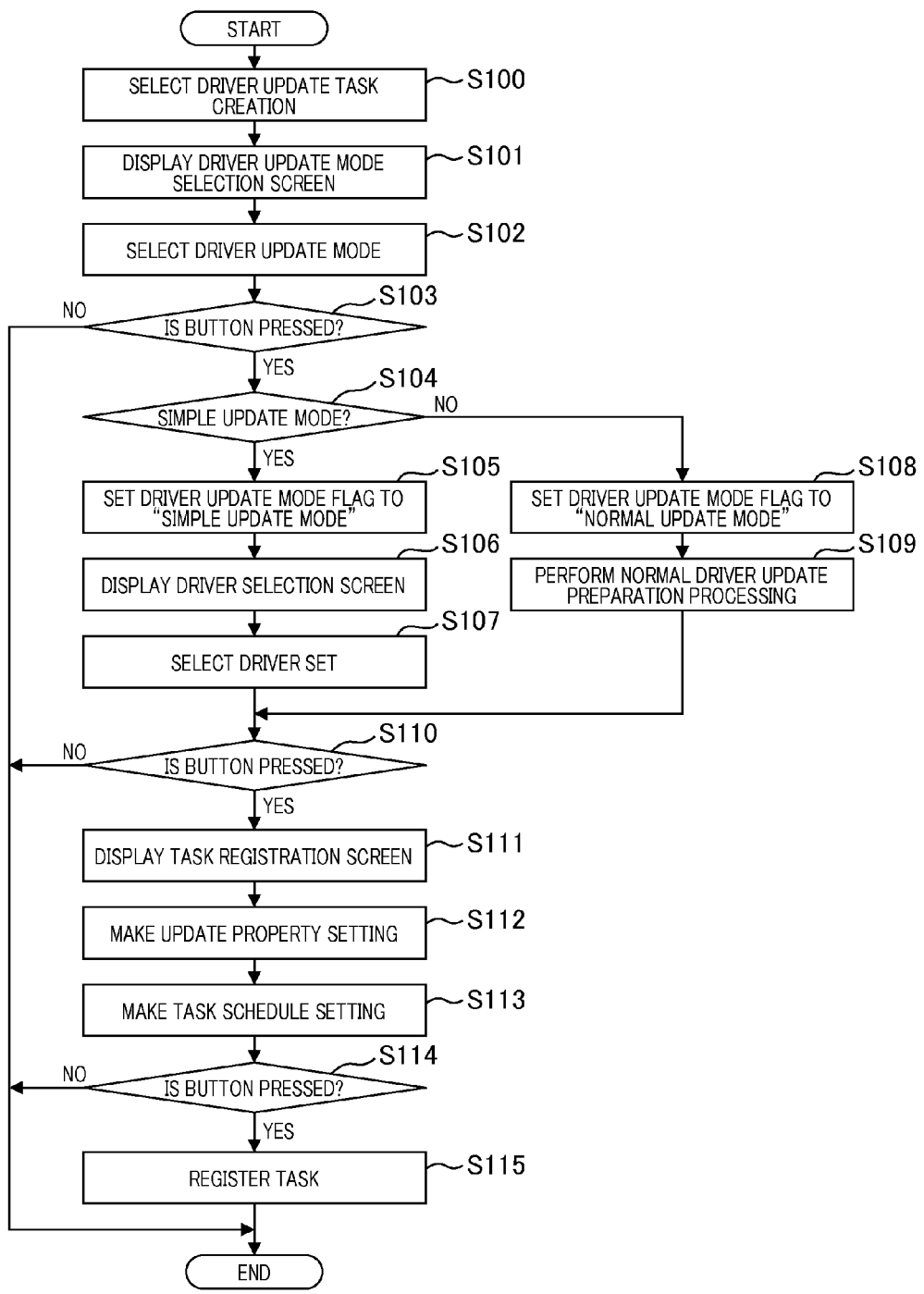
FIG. 8 is a flowchart for creating a remote driver update task.

Next, a detailed description will be given of control by the management device of the present embodiment with reference to the flowcharts shown in FIG. 5B, FIG. 6, FIG. 7, and FIG. 8 to FIG. 11, and the UI diagrams shown in FIGS. 12 to 13A. The flowchart in FIG. 8 shows processing for remotely creating a driver update task. Firstly, the driver management unit 33 selects a driver update task creation function (step S100). Next, the driver management unit 33 displays a driver update mode selection screen indicating STEP 1 of driver update task creation on the CRT 15 (step S101).

FIG. 12 is a diagram illustrating an exemplary driver update mode selection screen. The driver update mode selection screen shown in FIG. 12 includes a normal update mode and a simple update mode. Furthermore, the driver update mode selection screen shown in FIG. 12 includes a [Next]

button for screen transition and a [Cancel] button for processing interruption. Here, the normal update mode is a conventional driver update mode in which a client selection screen on which the clients for which the driver is to be updated are selectable from the client list shown in FIG. 7 is displayed on the CRT 105 so as to make the administrator who uses the management device select the clients on the screen.

On the other hand, the simple update mode is a driver update mode in which the client devices to be updated are automatically extracted upon execution of a driver update task without explicitly selecting the client devices for which the driver is to be updated by the administrator on the screen. The simple update mode may also be referred to as "change mode". The administrator selects the driver update mode via the KB 107 (step S102). In the present embodiment, an assumption is made that the administrator has selected the simple update mode as the driver update mode in step S102.

Next, the driver management unit 33 determines the button action from the KB 107 (step S103). When the driver management unit 33 determines that the [Next] button has been pressed, the process shifts to step S104. Next, the driver management unit 33 determines whether the driver update mode is either the simple update mode or the normal update mode (step S104). When the driver management unit 33 determines that the driver update mode is the simple update mode, the process shifts to step S105. Next, the driver management unit 33 sets the driver update mode flag to the simple update mode (step S105). Next, the driver management unit 33 displays a driver selection screen indicating STEP 2 of driver update task creation on the CRT 15 (step S106).

An exemplary driver selection screen is shown in FIG. 13A. The driver list shown in FIG. 6 is selectable on the driver selection screen shown in FIG. 13A. Furthermore, the driver selection screen shown in FIG. 13A includes a [Next] button for screen transition and a [Cancel] button for processing interruption. Next, the administrator selects a driver to be updated via the KB 107 (step S107). In the present embodiment, assumption is made that the administrator has selected a driver with a driver name of DrvA and a version of v2.0 shown in FIG. 13A in step S107. Next, the driver management unit 33 determines the button action from the KB 107 (step S110). When the driver management unit 33 determines that the [Next] button has been pressed, the process shifts to step S111. The driver management unit 33 displays a task registration screen indicating STEP 3 of driver update task creation on the CRT 15.

FIGS. 14A and 14B are diagrams illustrating an exemplary task registration screen. The task registration screen shown in FIG. 14A includes items such as task type, selected driver, driver update property setting, and task schedule setting. The task type is information indicating the type of task such as driver update, printer addition, printer deletion, or the like and depends on the function selected in step S100. The task type in the present embodiment is a driver update task. The selected driver is a driver selection item that is driver information of the driver selected in step S107. The task schedule setting is edition control for setting a task execution time.

In the driver update property setting, setting information indicating whether or not an instruction for installing a driver to be changed is forcibly transmitted is displayed. In the driver update property setting, the administrator validates a check box of "forcibly update driver". In this manner, the driver management unit 33 can forcibly update the driver of the client that generates a plurality of printer objects from the identical driver as in the clients PCC-1 to PCC-x shown in FIG. 4.

In the task schedule setting shown in FIG. 14A, a yyyy/mm/dd-hh:mm type setting is made but other yyyy-mm-dd-hh-mm type settings may also be made. Furthermore, an immediate execution setting or a periodical execution setting may also be made. Furthermore, the task registration screen shown in FIG. 14A includes a [Register] button for registering task content in the data storage unit 33 and a [Cancel] button for processing interruption. Next, the administrator makes a driver update property setting via the KB 107 (step S112). Next, the administrator makes a task schedule setting via the KB 107 (step S113). Next, the driver management unit 33 determines the button action from the KB 107 (step S114). When the driver management unit 33 determines that the [Register] button has been pressed, the process shifts to step S115. Next, the driver management unit 33 stores the driver update task set in step S105 and displayed in FIG. 14A as task information in the data storage unit 33 (step S115).

On the other hand, when the driver management unit 33 determines in step S104 that the driver update mode is the normal update mode, the process shifts to step S108. Next, the driver management unit 33 sets the driver update mode flag to the normal update mode (step S108). Next, the driver management unit 33 performs normal driver update preparation processing for explicitly selecting a client and its driver to be updated by the administrator (step S109). Subsequently, the driver management unit 33 performs processing from step S110 to step S115. The driver update task information stored in the data storage unit 33 in step S115 is information which is displayed and set in FIG. 14A in association with the client to be updated which is selected by the administrator in steps S108 and S109.

Figure 9:
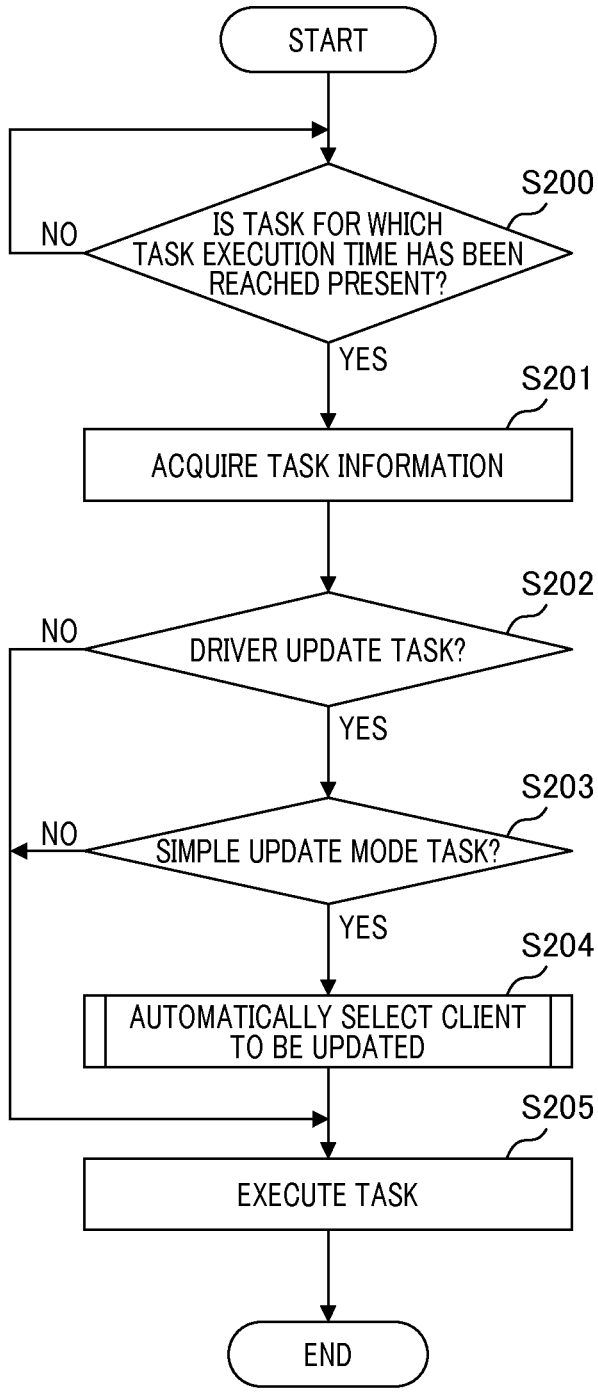
FIG. 9 is a flowchart for executing a remote driver update task.
Figure 10:
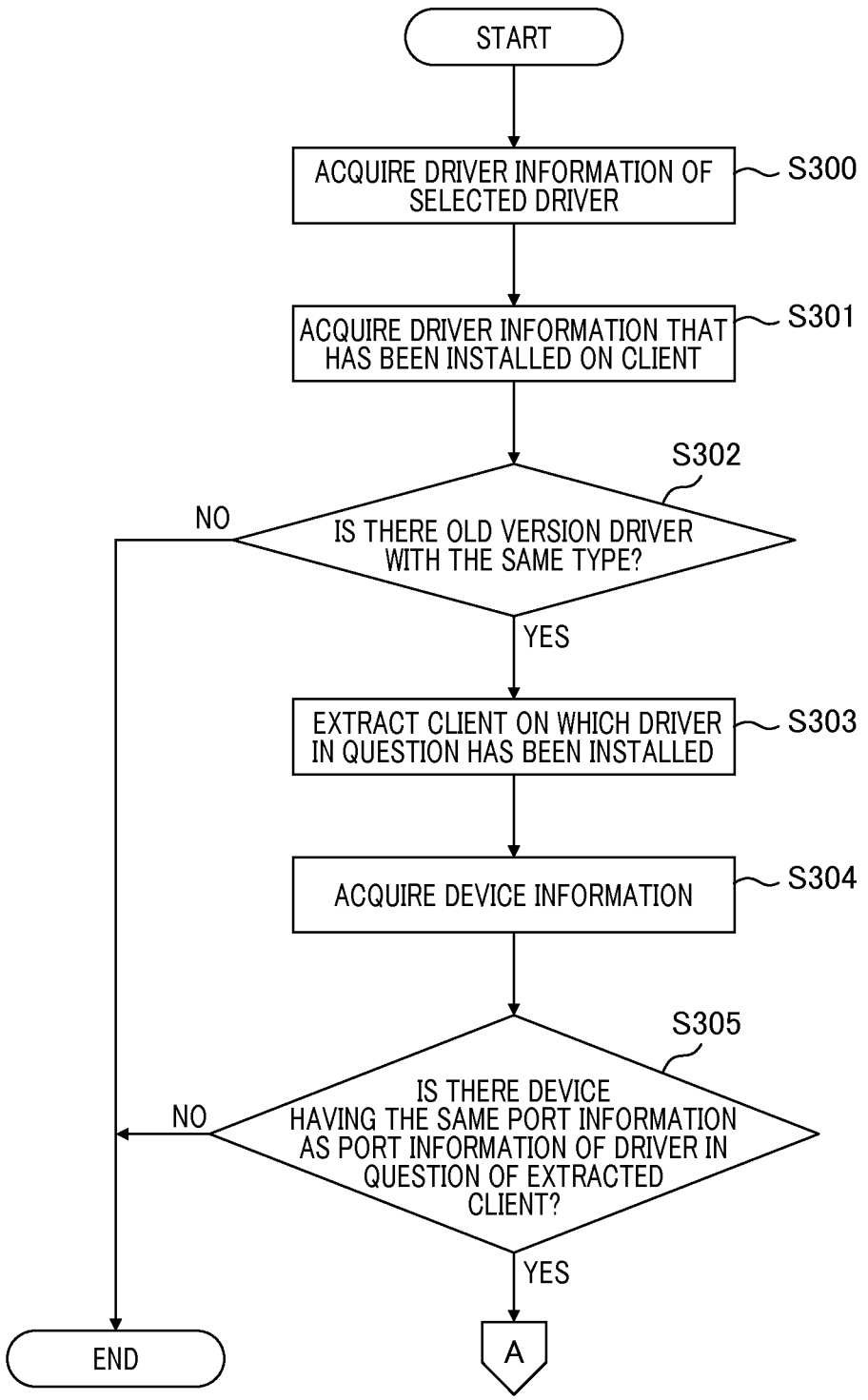
FIG. 10 is a flowchart for determining a client to be updated.

Next, the driver update task execution processing stored in the data storage unit 33 in the flowchart shown in FIG. 8 is shown in the flowcharts in FIGS. 9 and 10. The task management unit 32 determines whether or not there is a task for which the task execution time has been reached from the task schedule from among the tasks stored in the data storage unit 34 (step S200). When the task management unit 32 determines in step S200 that there is a task for which the task execution time has been reached, the task management unit 32 notifies the storage source of the task of the presence of the task and then the process shifts to step S201. In the present embodiment, the task management unit 32 notifies the driver management unit 33 of the presence of the task for which the task execution time has been reached.

Next, the driver management unit 33 that has been instructed to perform task execution from the task management unit 32 acquires task information (FIG. 14A) of the task stored in the data storage unit 34 (step S201). The driver management unit 33 determines whether or not the acquired task is the driver update task based on the task type of task information (step S202). When the driver management unit 33 determines in step S202 that the task type is the driver update task, the process shifts to step S203. Next, the driver management unit 33 determines whether or not the acquired task is a task in a simple update mode from the driver update mode flag of task information (step S203). When the driver management unit 33 determines that the task is in a simple update mode, the process shifts to step S204. Next, the driver management unit 33 automatically extracts a client to be updated (step S204). A detailed description of step S204 will be described below with reference to FIGS. 10 and 11.

Next, the driver management unit 33 executes driver update processing for the driver control unit 40 of a client to be updated (step S205). On the other hand, when the driver management unit 33 determines in step S202 that the task type is not a driver update task, the driver management unit 33 executes a task other than driver update. Furthermore, the driver management unit 33 determines in step S203 that the task is not in a simple update mode, the driver management unit 33 executes a normal driver update task.

Figure 11:
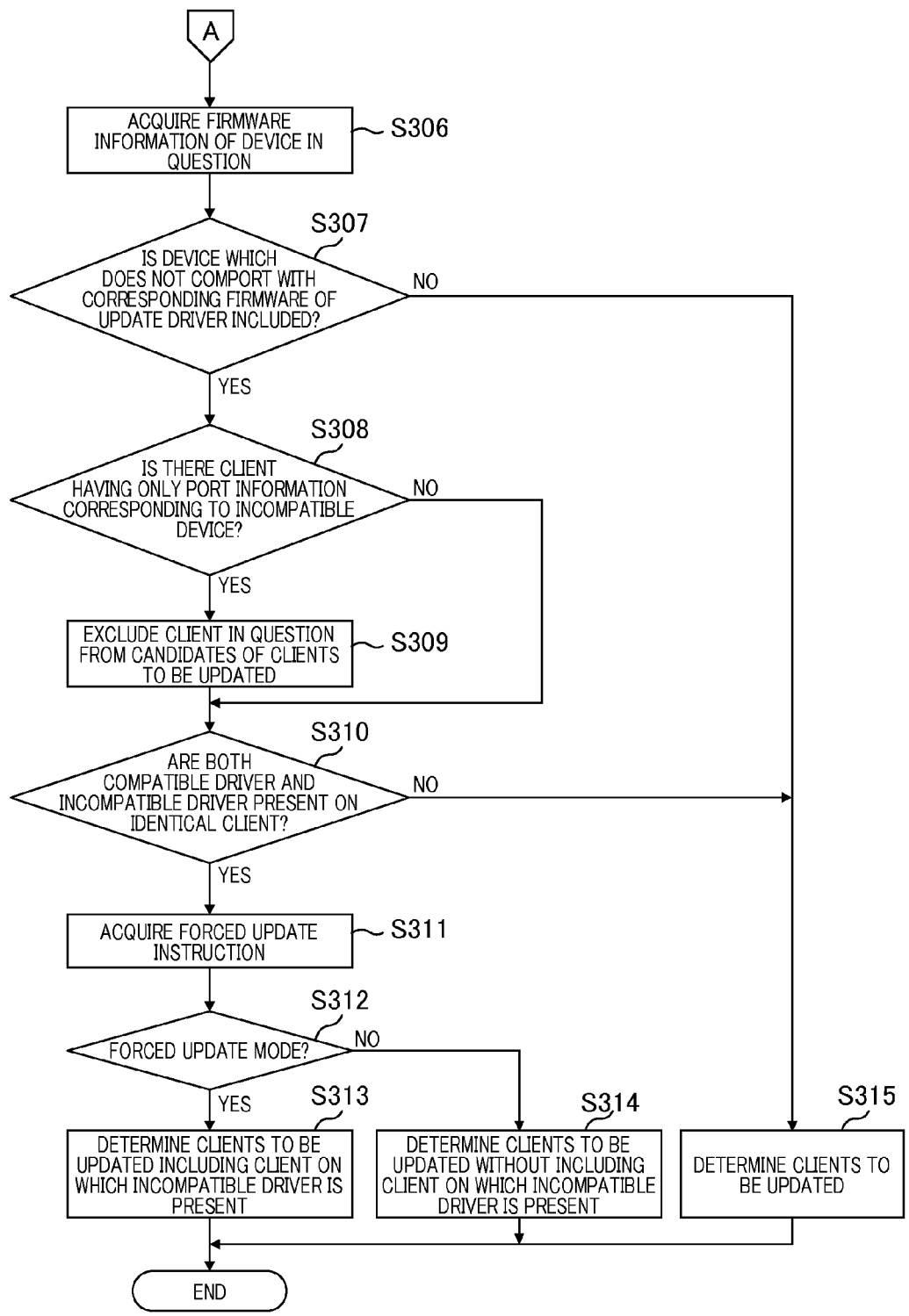
FIG. 11 is a flowchart for determining a client to be updated.

FIGS. 10 and 11 are detailed flows for automatically extracting a client to be updated in step S204 described with reference to FIG. 9. The driver management unit 33 acquires a selected driver (specifically, a driver name of DrvA, a version of v2.0, and corresponding firmware of Firm 2, or the like) from task information (FIG. 13A) of tasks stored in the data storage unit 34 (step S300). Next, the driver management unit 33 acquires the client list shown in FIG. 7 to thereby acquire driver information installed on the client (step S301). Next, the driver management unit 33 compares driver information of the selected driver acquired in step S300 with driver information of the client list acquired in step S301 (step S302).

In step S302, the driver management unit 33 determines whether or not there is a client 3000 having an old version driver with the same driver name as that in the driver information acquired in step S300 on the client list shown in FIG. 7. In the present embodiment, the driver management unit 33 determines whether or not there is a client 3000 having a driver with a driver name of DrvA and a version older than v2.0. When there are clients 3000 in question, the process shifts to step S303.

Next, the driver management unit 33 extracts the clients 3000 in question as candidates of clients to be updated (step S303). In the present embodiment, the driver management unit 33 extracts the clients PCA-1 to PCA-x, PCB-1 to PCB-x, and PCC-1 to PCC-x as candidates of clients to be updated from the client list shown in FIG. 7. In other words, the driver management unit 33 specifies a client device which is utilizing a driver of corresponding type with reference to client information upon changing a driver.

Next, the driver management unit 33 acquires device information from the data storage unit 34 (step S304). In the present embodiment, it means that the driver management unit 33 acquires the device list shown in FIG. 5B from the data storage unit 34. The device DevA-1 shown in FIG. 5B indicates that firmware shown in FIG. 5A has been updated from Firm1 to Firm2.

Next, the driver management unit 33 acquires port information of the client 3000 extracted in step S303. The driver management unit 33 determines whether or not there is a device 2000 having port information and an address corresponding thereto by matching the acquired port information and the addresses on the device list acquired in step S304 (step S305). For example, port information corresponding to the address Addr1 of the device DevA-1 shown in FIG. 5B is port information such as IP_Addr1. Since the address of the device 2000 is set as a part of port information, the driver management unit 33 determines that the port information corresponds to the address. In the present embodiment, it means that the driver management unit 33 determines whether or not the device 2000 having an address which can generate port information IP_Addr1 and IP_Addr2 is present on the device list shown in FIG. 5B. Thus, the driver management unit 33 determines that the devices DevA-1 and DevA-2 on the device list shown in FIG. 5B are the corresponding devices 2000. As described above, a client device in which the image forming device specified from device information is set as the output destination can be appropriately extracted as the transmission destination of an installation instruction by matching device information and client information.

As shown in FIG. 11, the driver management unit 33 acquires firmware information from device information of the device 2000 specified in step S305 (step S306). In the present embodiment, the driver management unit 33 acquires the firmware Firm 2 and Firm1 of the devices DevA-1 and DevA-2, respectively. Next, the driver management unit 33 determines whether or not there is a device 2000 in which firmware information of the device 2000 acquired in step S306 does not comport with corresponding firmware (specifically, Firm2) of the driver to be updated acquired in step S300 (step S307). In the present embodiment, the driver management unit 33 determines that the device DevA-2 which does not comport with corresponding firmware Firm 2 of the driver to be updated is present.

Next, the driver management unit 33 extracts client devices in which the devices DevA-1 and DevA-2 which have been specified in step S306 are set as the output destination from among the clients 3000 extracted in step S303. Then, the driver management unit 33 determines whether or not there is a client 3000 having port information only in which the device DevA-2 specified in step S307 is set as the output destination (step S308). In the present embodiment, the driver management unit 33 determines that there are the clients PCB-1 to PCB-x in which only the device DevA-2 is set as the output destination from among the extracted clients PCA-1 to PCA-x, PCB-1 to PCB-x, and PCC-1 to PCC-x.

Next, the driver management unit 33 excludes the clients PCB-1 to PCB-x specified in step S308 from the candidates of clients to be updated extracted in step S303 (step S309). Specifically, the driver management unit 33 extracts client devices in which a device which comports with firmware is set as the output destination. Then, the driver management unit 33 excludes client devices in which an image forming device which does not comport with firmware information corresponding to a driver to be changed is set as the output destination from the transmission destination of an installation instruction. Thus, the candidates of clients to be updated are narrowed to the clients PCA-1 to PCA-x and PCC-1 to PCC-x in step S309 so that combinations of devices and drivers, which are not intended by the administrator, can be prevented from being made.

Next, the driver management unit 33 determines whether or not there is a client 3000 having a driver in which the device 2000 which comports with corresponding firmware of the driver acquired in step S300 and the device 2000 which does not comport therewith are set as the output destination (step S310). When the driver management unit 33 determines in step S310 that there is a client 3000 having a driver in which the device 2000 which comports with corresponding firmware of the driver acquired in step S300 and the device 2000 which does not comport therewith are set as the output destination, the process shifts to step S311. In the present embodiment, the driver management unit 33 determines that the clients PCC-1 to PCC-x are the client devices in question from among the clients PCA-1 to PCA-x, and PCC-1 to PCC-x which have been narrowed in step S309.

Next, the driver management unit 33 acquires driver update property setting information from the data storage unit 34 (step S311). Next, the driver management unit 33 determines whether or not the driver update property setting acquired in step S311 is a setting for forcibly updating a driver (step S312). When the driver update property setting acquired in step S311 is a setting for forcibly updating a driver, the process shifts to step S313.

Next, the driver management unit 33 determines the client 3000 narrowed in step S309 as the client to be updated (step S313). In the present embodiment, it means that the driver management unit 33 determines the clients PCA-1 to PCA-x and PCC-1 to PCC-x as the clients to be updated. Then, the driver management unit 33 transmits an update instruction for updating from the driver DrvA (version v1.0) to the driver DrvA (version v2.0) to the driver control unit 40 of each of the clients PCA-1 to PCA-x. Also, the driver management unit 33 instructs the driver control unit 40 of each of the clients PCC-1 to PCC-x to perform updating from the driver DrvA (version v1.0) having port information IP_Addr1 and IP_Addr2 to the driver DrvA (version v2.0). When the driver management unit 33 determines in step S312 that the driver update property setting acquired in step S311 is not a setting for forcibly updating a driver, the process shifts to step S314.

Next, the driver management unit 33 determines the clients 3000 other than the client 3000 having a driver in which the device 2000 which comports with corresponding firmware and the device 2000 which does not comport therewith are set as the output destination as the clients to be updated (step S314). In the present embodiment, it means that the driver management unit 33 excludes the clients PCC-1 to PCC-x and determines the clients PCA-1 to PCA-x as the clients to be updated. Consequently, the driver management unit 33 instructs the driver control unit 40 of each of the clients PCA-1 to PCA-x to perform updating from the driver DrvA (version v1.0) to the driver DrvA (version v2.0).

On the other hand, when the driver management unit 33 determines in step S310 that there is no client 3000 having a driver in which the device 2000 which comports with corresponding firmware of the driver acquired in step S300 and the device 2000 which does not comport therewith are set as the output destination, the process shifts to step S315. Next, the driver management unit 33 determines the client 3000 having a driver in which only the device 2000 which comports with corresponding firmware is set as the output destination as the client to be updated (step S315). In the present embodiment, it means that the driver management unit 33 determines the clients PCA-1 to PCA-x as the clients to be updated when there is no client PCC-1 to PCC-x on the client list shown in FIG. 7. Consequently, the driver management unit 33 instructs the driver control unit 40 of each of the clients PCA-1 to PCA-x to perform updating from the driver DrvA (version v1.0) to the driver DrvA (version v2.0).

When the driver management unit 33 determines in step S307 that firmware information of the device 2000 acquired in step S306 comports with corresponding firmware of the driver to be updated, the process shifts to step S315. When the driver management unit 33 determines in step S308 that there is no client 3000 having port information only in which the device 2000 specified in step S307 is set as the output destination from among the clients 3000 extracted in step S303, the process shifts to step S310.

On the other hand, when the driver management unit 33 determines in step S302 that there is no client 3000 having an old version driver with the same driver name as that in the driver information acquired in step S300, i.e., when there is no client to be updated, the process ends. Likewise, when the driver management unit 33 also determines in step S305 that there is no device 2000 having port information such that port information corresponding to driver information of the clients 3000 extracted in step S303 can be generated from the addresses on the device list acquired in step S304, the process ends.

According to the present embodiment, manual selection of the client 3000 to be updated becomes unnecessary upon driver update. Also, the management device of the present invention manages device information and driver information installed on client devices so that a client device for which the driver to be updated can be appropriately selected from among a plurality of client devices. In other words, even when a driver corresponds to specific firmware of a device, automatic extraction of the client 3000 to be updated can be realized so as to provide the combination of an appropriate driver and the device 2000 or the combination intended by the administrator. In this manner, selection processing upon driver update is simplified and an appropriate result of installation is realized. Consequently, the operability of the management device by the IT administrator improves, resulting in a reduction in management cost of computer system.

Second Embodiment

Figure 15:
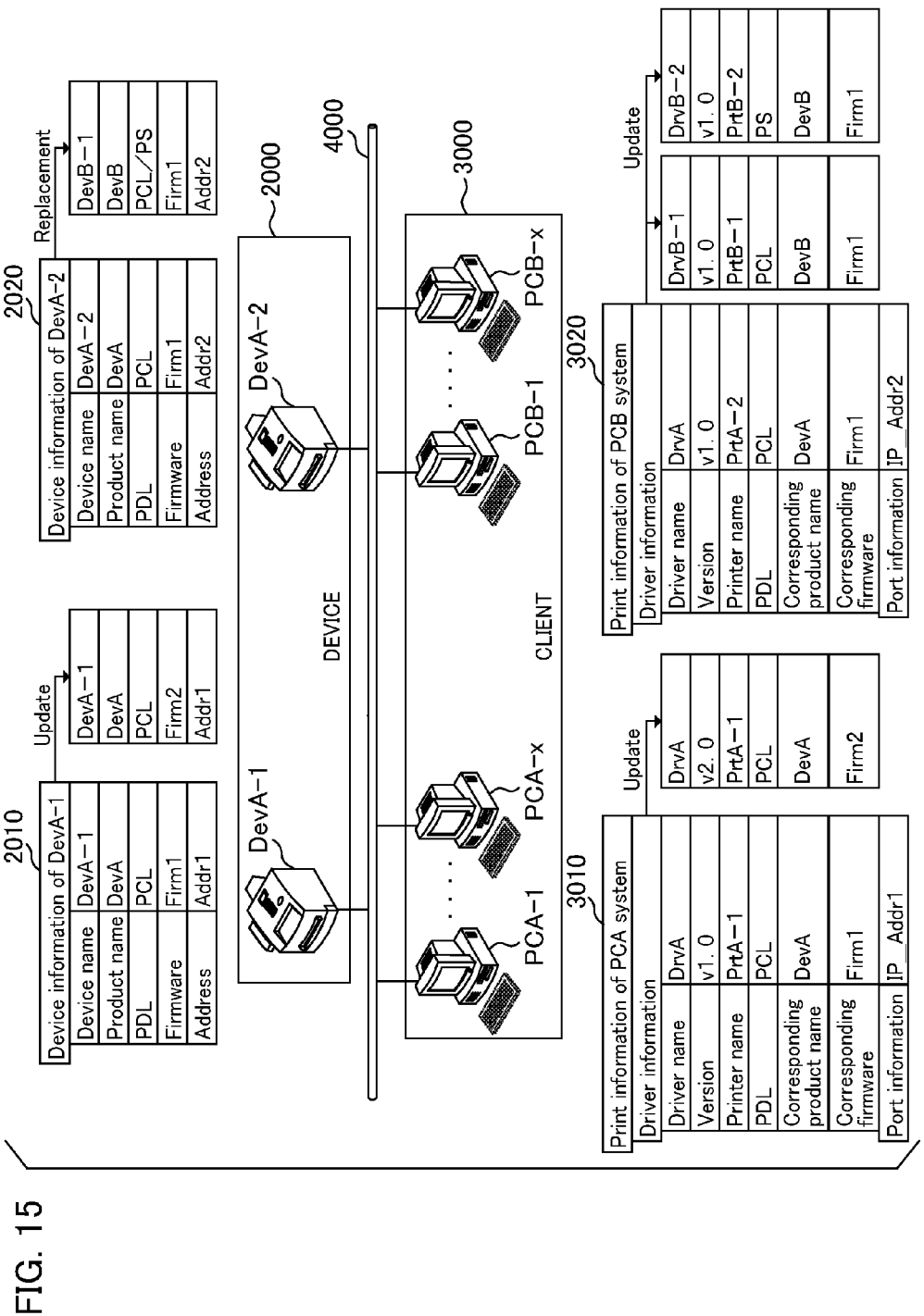
FIG. 15 illustrates an example of other information provided in the devices of the management system.

Next, a description will be given of a second embodiment of the present invention. FIG. 15 is a diagram illustrating an example of a configuration of the management system of the second embodiment. The management system shown in FIG. 15 includes the devices 2000 with device names of DevA-1 and DevA-2 and the clients 3000 (PCA-1 to PCA-x and PCB-1 to PCB-x). In FIG. 15, the devices 2000, the clients 3000, and the communication line 4000, device information 2010 and 2020 of the devices 2000, and print information 3010 and 3020 of the client 3000 are the same as those described with reference to FIG. 4.

As in FIG. 4, assumption is made in FIG. 15 that firmware of the device information 2010 of the device DevA-1 is updated from Firm1 to Firm2 and the device DevA-2 is replaced with the device DevB-1. Here, when the device DevA-2 is replaced with the device DevB-1, the address of the device DevA-2 prior to replacement is preserved in the device DevB-1 after replacement. Also, a driver corresponding to the device DevA-2 is different from that corresponding to the device DevB-1 because the device DevA-2 and the device DevB-1 are provided by different vendors. In the present embodiment, assumption is made that drivers corresponding to the device DevB-1 are the drivers DrvB-1 and DrvB-2 shown in FIG. 6.

At this time, it is preferable that the clients 3000 to be updated upon driver update are the clients PCA-1 to PCA-x and PCB-1 to PCB-x. Furthermore, it is preferable that the driver installed on the clients PCA-1 to PCA-x is updated from the driver DrvA (version v1.0) to the driver DrvA (version v2.0) corresponding to the device DevA-1 (firmware Firm 2). On the other hand, it is preferable that the driver installed on the clients PCB-1 to PCB-x is updated from the driver DrvA to the drivers DrvB-1 and DrvB-2 corresponding to the replaced device DevB-1 (firmware Firm1). Hereinafter, a description will be given of a preferred and detailed embodiment of the present invention in order to realize the aforementioned purpose.

In FIG. 16 and FIG. 17, steps S400 to S403 are added to steps S300 to step S305, steps S306 to step S309, and step S315 in the flowchart shown in FIG. 10. The driver management unit 33 acquires port information of the clients 3000 extracted from the client list shown in FIG. 7 in step S303. In step S304 shown in FIG. 16, the driver management unit 33 acquires device information shown in FIG. 5C. The driver management unit 33 determines whether or not there is a device 2000 having port information and an address corresponding thereto by matching the port information acquired in step S303 and the addresses on the device list acquired in step S304. When the driver management unit 33 determines that there is a device 2000 having port information and an address corresponding thereto, the process shifts to step S400. In the present embodiment, it means that the driver management unit 33 determines whether or not the device 2000 having an address which can generate port information IP_Addr1 and IP_Addr2 is present. Thus, the driver management unit 33 determines that the devices DevA-1 and DevA-2 on the device list shown in FIG. 5C are the corresponding devices 2000.

As shown in FIG. 17, the driver management unit 33 determines whether or not there are the device 2000 specified in step S305 and the device 2000 different from the device 2000 supported by the selected driver (step S400). When there are the device 2000 specified in step S305 and the device 2000 different from the device 2000 supported by the selected driver, the process shifts to step S401. In the present embodiment, it means that the driver management unit 33 determines whether or not there are the devices DevA-1 and Dev B-1 and the device DevA supported by the selected driver DrvA (version v2.0). Consequently, the driver management unit 33 determines that the device DevA-1 is the same as the device DevA but the device DevB-1 is different from the device DevA.

Next, the driver management unit 33 acquires the driver list shown in FIG. 6 (step S401). Next, the driver management unit 33 determines whether or not there is a driver corresponding to the device 2000 (the device DevB-1) determined as the different device in step S400 on the driver list acquired in step S401 in FIG. 6 (step S402). When there is a driver corresponding to the device 2000 (the device DevB-1) determined as the different device in step S400 on the driver list acquired in step S401 in FIG. 6, the process shifts to step S403. In the present embodiment, the driver management unit 33 determines that there are the drivers DrvB-1 and DrvB-2 on the driver list shown in FIG. 6 as the driver corresponding to the device DevB-1 determined as the different device in step S400.

Next, the driver management unit 33 adds the driver determined to be present in step S402 to a driver update task selection driver (step S403), and the process shifts to step S306. In the present embodiment, it means that the driver management unit 33 adds the drivers DrvB-1 and DrvB-2 to the driver update task selection driver. Hereinafter, the driver management unit 33 determines that the clients to be updated are the clients PCA-1 to PCA-x and PCB-1 to PCB-x in steps S306 to S309 and step S315. Consequently, the driver management unit 33 can instruct the driver control unit 40 of each of the clients PCA-1 to PCA-x to perform updating from the driver DrvA (version v1.0) to the driver DrvA (version v2.0). On the other hand, the driver management unit 33 instructs the driver control unit 40 of each of the clients PCB-1 to PCB-x to perform updating from the driver DrvA (version v1.0) to the drivers DrvB-1 and DrvB-2.

According to the present embodiment, even when the device 2000 has been replaced, automatic extraction of the client 3000 to be updated can be realized so as to provide the combination of an appropriate driver and the device 2000. In this manner, selection processing upon driver update is simplified and an appropriate result of installation is realized. Consequently, the operability of the management device by the IT administrator improves, resulting in a reduction in management cost of computer system.

Third Embodiment

Next, a description will be given of a third embodiment of the present invention. In FIG. 15, assumption is made that the device DevA-2 has been replaced with the device DevB-1 without updating firmware of the device information 2010 of the device DevA-1. At this time, it is preferable that the clients 3000 to be updated upon driver update are the clients PCB-1 to PCB-x. Furthermore, it is preferable that the clients PCB-1 to PCB-x are updated from the driver DrvA to the drivers DrvB-1 and DrvB-2 corresponding to the replaced device DevB-1 (firmware Firm1). Hereinafter, a description will be given of the flow of processing for realizing the aforementioned purpose.

In the flowchart shown in FIG. 18, driver selection screen display in step S106 and driver set selection in step S107 in the flowchart shown in FIG. 8 have been changed to device selection screen display in step S500 and device selection in step S501, respectively. Also, update property setting in step S112 is removed and corresponding driver extraction in step S502 and driver editing extracted in step S503 have been added. FIG. 19 is a flowchart instead of the flowchart shown in FIG. 10. FIG. 13A is replaced with FIG. 13B and FIG. 14A is replaced with FIG. 14B. Firstly, a description will be given of driver update task registration with reference to FIG. 13B, FIG. 14B, and FIG. 18.

After the driver management unit 33 sets the simple update mode to the driver update mode flag in step S105, the driver management unit 33 displays a device selection screen indicating STEP 2 of driver update task creation on the CRT 15 (step S500). An exemplary device selection screen is shown in FIG. 13B. The device list shown in FIG. 5C is selectable on the device selection screen shown in FIG. 13B. Manual settings in which the device 2000 which has not yet been connected to the communication line 4000 and thus cannot be searched by device search of the driver search unit 31 can be selectably set are provided on the device selection screen shown in FIG. 13B. Instead of manual settings, a file such as a CSV file may be imported for selection. Furthermore, the driver selection screen in FIG. 13B includes a [Next] button for screen transition and a [Cancel] button for processing interruption.

The administrator selects the device 2000 after replacement via the KB 107 (step S501). In the present embodiment, assumption is made that the administrator has selected the device DevB-1 shown in FIG. 13B in step S501. Next, the driver management unit 33 determines the button action from the KB 107 (step S110). When the driver management unit 33 determines that the [Next] button has been pressed, the process shifts to step S111.

Next, the driver management unit 33 extracts a driver corresponding to the device selected in step S501 from the driver list shown in FIG. 6 (step S502). In the present embodiment, the driver management unit 33 extracts the drivers DrvB-1 and DrvB-2 from the driver list shown in FIG. 6.

Next, the driver management unit 33 displays the task registration screen indicating STEP 3 of driver update task creation on the CRT 15 (step S111). An exemplary task registration screen is shown in FIG. 14B. The task registration screen shown in FIG. 14B includes task type, selected device, update driver settings, and task schedule settings. The selected device displays device information of the replaced device 2000 selected in step S501. The update driver settings display driver information of the driver extracted in step S502. Furthermore, a check box which can intentionally exclude a driver to be updated when the extracted driver is in plural is provided on the update driver settings. Note that the task type and the task schedule settings are the same as those shown in FIG. 4A. Also, the task registration screen shown in FIG. 14B includes a [Register] button for registering task content in the data storage unit 33 and a [Cancel] button for processing interruption. Next, after making the update driver settings, the administrator performs driver update task registration in steps S113 to S115 via the KB 107.

FIG. 19 shows a detailed flow of automatic extraction of the client 3000 to be updated in step S204 shown in FIG. 9. The driver management unit 33 acquires the address of the selected device from task information (FIG. 14B) stored in the data storage unit 34 (step S600). In the present embodiment, the driver management unit 33 acquires the address Addr2 of the selected device DevB-1. Next, the driver management unit 33 acquires the client list shown in FIG. 7 from the data storage unit 34 (step S601). In the present embodiment, the client list shown in FIG. 7 is constituted by the clients PCA-1 to PCA-x and PCB-1 to PCB-x and does not include the clients PCC-1 to PCC-x.

Next, the driver management unit 33 determines whether or not there is a client 3000 having port information corresponding to the address of the device 2000 acquired in step S600 (step S602). When there is a client 3000 having port information corresponding to the address of the device 2000 acquired in step S600, the process shifts to step S603. In the present embodiment, the driver management unit 33 determines that the clients PCB-1 to PCB-x having port information IP_Addr2 corresponding to the address Addr-2 of the device 2000 are the clients 3000 in question.

Next, the driver management unit 33 determines the clients 3000 in question in step S602 as the clients to be updated (step S603). In the present embodiment, the driver management unit 33 determines the clients PCB-1 to PCB-x as the clients to be updated. On the other hand, when the driver management unit 33 determines in step S602 that there is no client 3000 in question, the process ends. Consequently, the driver management unit 33 instructs the driver control unit 40 of each of the clients PCB-1 to PCB-x to perform updating from the driver DrvA (version v1.0) to the drivers DrvB-1 and DrvB-2 (both in version v1.0).

According to the present embodiment, manual selection of the client 3000 to be updated becomes unnecessary upon driver update. Also, the management device of the present invention manages device information and driver information installed on client devices so that a client device for which the driver to be updated can be appropriately selected from among a plurality of client devices. In other words, even when a driver corresponds to specific firmware of a device, automatic extraction of the client 3000 to be updated can be realized so as to provide the combination of an appropriate driver and the device 2000 or the combination intended by the administrator. In this manner, selection processing upon driver update is simplified and an appropriate result of installation is realized. Consequently, the operability of the management device by the IT administrator improves, resulting in a reduction in management cost of computer system.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, For example, reading out and executing a program recorded on a memory device to perform the functions of the above-described embodiments. For this purpose, the program is provided to the computer. For example via a network or from a storage medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178776 filed on Aug. 10, 2012, which is hereby incorporated by reference herein in its entirety.

What is claimed is:

1. A management device that provides an instruction for installing a driver for use in a peripheral device to a plurality of client devices via a network, the management device comprising at least a processor configured to control:
   a management unit configured to manage management information including a type and a version of a driver installed on each client device and an output destination;
   a specification unit configured to specify, when a driver to be utilized in the client devices is changed in accordance with a change in information of the peripheral device, client devices on which a driver has been installed corresponding in type to the peripheral device whose information has been changed, with reference to the management information;
   an acquiring unit configured to acquire port information of each driver corresponding to the peripheral device whose information has been changed as an output destination set in each of the client devices specified by the specification unit;
   an extraction unit configured to extract, from among the specified client devices, a client device to be transmitted an instruction for installing a driver by using identification information included in the acquired port information, wherein, in the client device extracted by the extraction unit, a driver, in which port information including the identification information of the peripheral device whose information has been changed is set, has been installed; and
   a transmission unit configured to transmit, to the extracted client device, an installation instruction for updating a driver to be changed.

2. The management device according to claim 1, wherein the management unit further manages information of the firmware version of the peripheral device corresponding to the version of the driver as the management information, and
   wherein the specification unit specifies client devices on which a driver corresponding in type to the peripheral device has been installed when the driver to be utilized in the client devices is changed in accordance with the change in firmware version of the peripheral device as the change in information of the peripheral device.

3. The management device according to claim 1, further comprising:
   a setting unit configured to set so as to cause the transmission unit to forcibly transmit the installation instruction even when a plurality of printer objects, of which the output destinations using a driver for use in the peripheral device are different from one another, is present.

4. The management device according to claim 1, wherein the specification unit specifies client devices on which a driver corresponding in type to the peripheral device prior to replacement has been installed when the driver to be utilized in the client devices is changed in accordance with the replacement of the peripheral device as the change in information of the peripheral device,
   wherein the acquiring unit acquires the port information of each driver corresponding to the peripheral device prior to the replacement as the output destination set in each of the client devices specified by the specification unit;
   wherein the extraction unit extracts, from among the specified client devices, a client device to be transmitted the instruction for installing the driver by using the identification information included in the acquired port information, wherein, in the client device extracted by the extraction unit, the driver, in which port information including the identification information of the peripheral device prior to the replacement is set, has been installed, and wherein the transmission unit transmits, to the extracted client device, the installation instruction for updating a driver for use in the peripheral device after the replacement.

5. The management device according to claim 1, wherein the peripheral device is an image forming device.

6. A method for controlling a management device that provides an instruction for installing a driver for use in a peripheral device to a plurality of client devices via a network, the method comprising:

managing management information including a type and a version of a driver installed on each client device and an output destination;

specifying, when a driver to be utilized in the client devices is changed in accordance with a change in information of the peripheral device, client devices on which a driver has been installed corresponding in type to the peripheral device whose information has been changed, with reference to the management information;

acquiring port information of each driver corresponding to the peripheral device whose information has been charged as an output destination set in each of the client devices specified in the specifying step;

extracting, from among the specified client devices, a client device to be transmitted an instruction for installing a driver by using identification information included in the acquired port information, wherein, in the client device extracted in the extracting step, a driver, in which port information including the identification information of the peripheral device whose information has been changed is set, has been installed; and transmitting, to the extracted client device, an installation instruction for updating a driver to be changed.

7. A non-transitory storage medium on which is stored a computer program for making a computer execute a method for controlling a management device that provides an instruction for installing a driver for use in a peripheral device to a plurality of client devices via a network, the method comprising:

managing management information including a type and a version of a driver installed on each client device and an output destination;

specifying, when a driver to be utilized in the client devices is changed in accordance with a change in information of the peripheral device, client devices on which a driver has been installed corresponding in type to the peripheral device whose information has been changed, with reference to the management information;

acquiring port information of each driver corresponding to the peripheral device whose information has been changed as an output destination set in each of the client devices specified in the specifying step;

extracting, from among the specified client devices, a client device to be transmitted an instruction for installing a driver by using identification information included in the acquired port information, wherein, in the client device extracted in the extracting step, a driver, in which port information including the identification information of the peripheral device whose information has been changed is set, has been installed; and transmitting, to the extracted client device, an installation instruction for updating a driver to be changed.

* * * * *